(12) United States Patent
Mor et al.

(10) Patent No.: US 6,917,986 B2
(45) Date of Patent: Jul. 12, 2005

(54) FAST FAILURE PROTECTION USING REDUNDANT NETWORK EDGE PORTS

(75) Inventors: Gal Mor, Rishon le Zion (IL); Shmuel Ilan, Ra'anana (IL)

(73) Assignee: Corrigent Systems Ltd., Tel Aviv (IL)

( * ) Notice: Subject to any disclaimer, the term of this patent is extended or adjusted under 35 U.S.C. 154(b) by 734 days.

(21) Appl. No.: 10/036,518

(22) Filed: Jan. 7, 2002

(65) Prior Publication Data

US 2003/0208618 A1 Nov. 6, 2003

(51) Int. Cl.[7] .............................................. G06F 15/173
(52) U.S. Cl. ...................... 709/238; 709/208; 709/226; 709/209; 709/239; 707/104.1; 370/396; 370/252; 370/352; 370/389
(58) Field of Search ................................. 709/238, 239, 709/208, 209, 226; 707/104.1; 370/396, 252, 352, 389

(56) References Cited

U.S. PATENT DOCUMENTS

| | | |
|---|---|---|
| 5,159,595 A | 10/1992 | Flanagan et al. |
| 5,307,353 A | 4/1994 | Yamashita et al. |
| 5,925,137 A | 7/1999 | Okanoue et al. |
| 6,246,667 B1 | 6/2001 | Ballintine et al. |
| 6,680,906 B1 | 1/2004 | Nguyen |

OTHER PUBLICATIONS

"IEEE Standard for Information Technology, Telecommunications and Information Exchange between Systems, Local and Metropolitan Area Network, Common Specifications, Part 3: Media Access Control (MAC) Bridges", Published as ANSI/IEEE Standard 802.1D (1998). Available at: standards.ieee.org/catalog/IEEE802.1.html.

*Primary Examiner*—William A. Cuchlinski, Jr.
*Assistant Examiner*—Thanh T. Nguyen
(74) *Attorney, Agent, or Firm*—Nixon & Vanderhye P.C.

(57) ABSTRACT

A method for fast protection in a fault-tolerant network includes coupling an edge switch in a network to one or more access switches via at least first and second redundant links, respectively connected to first and second ports of the edge switch. The first port is placed in an active state, while the second port is placed in a blocking state, so that communication traffic is conveyed over the first link, and each of the switches builds a respective database for use in forwarding the traffic. Responsive to a failure associated with the first link, the second port is placed in the active state and the first port is placed in the blocking state. Dummy traffic is then sent from the edge switch over the second link to the one or more access switches, so as to cause each of the one or more access switches to modify its respective database responsive to the second port being in the active state.

24 Claims, 4 Drawing Sheets

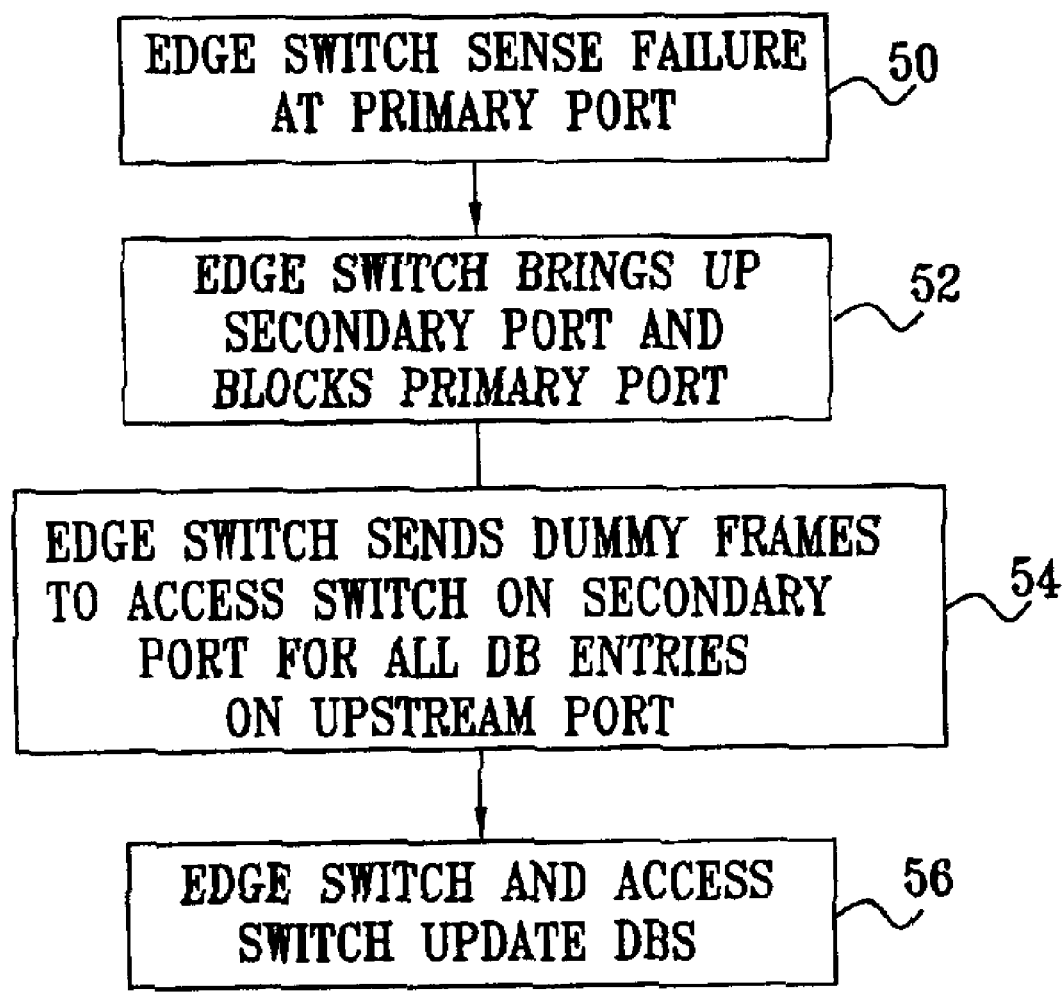

FAST FAILURE PROTECTION USING REDUNDANT NETWORK EDGE PORTS

FIELD OF THE INVENTION

The present invention relates generally to communication networks, and specifically to methods and devices for providing reliable, fault-resistant network access.

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/catalog/IEEE802.1.html. Each computing system connects to a LAN through a MAC device. MAC bridges that implement the 802.1D standard allow MAC devices attached to separate LANs to appear to each other as if they were attached to a single LAN.

The most common type of MAC bridge is a switch, which has multiple ports connecting it to LANs, other switches, host computing systems, or other network elements. Switches can be roughly classified as access switches or core switches. An access switch has ports that connect to LANs and/or to other network endpoints, such as user computer systems. Core switches interconnect the access switches into a Wide Area Network (WAN), by direct connection between the core switch and access switches and/or by connection to other core switches. Core switches that are directly connected to access switches are referred to herein as edge switches.

When a switch receives a data frame on one of its ports, it examines the destination MAC address carried in the frame header to determine through which of its output ports the frame should be transmitted. For this purpose, in accordance with the above-mentioned 802.1D standard, the switch maintains a filtering database, indicating the appropriate destination port for each MAC address in the database. The switch ports use the filtering database as a lookup table (LUT) for forwarding frames that they receive. When the switch receives a frame on one of its ports from a particular source MAC address, it "learns" to associate that MAC address with that port and places a corresponding entry in its filtering database. When the switch receives a frame with a destination address that does not appear in its database, it "floods," or broadcasts, the frame through all its ports except the port on which the frame was received. Broadcast and multicast frames are similarly distributed by flooding. On the other hand, when the switch finds that the destination address of a frame received on one of its ports is associated in its database with that same port, it discards, or "filters," the frame.

As the switch receives packets, it continually adds entries to its filtering database. In order to avoid filling up the database with stale entries and to enable the database to be updated when changes occur in network topology, the 802.1D standard defines an aging mechanism. When an entry is created in the table due to a frame having been received from a particular source MAC address, the entry receives a time stamp. Whenever another frame is received from the same address (on the same port), the time stamp is updated. If the time stamp is not updated within a predetermined time limit, the entry is erased. The default aging time is five minutes. Because of this long aging time, it can take a long time to rebuild the filtering database after a network topology change.

To protect against failures of network equipment and communication media, it is common to provide multiple, redundant paths between switches in the network. For example, access switches are typically connected to edge switches by dual links. These links may be in the form of connections between each of a pair of ports on one access switch with a corresponding pair of ports on the edge switch. Alternatively, each of two access switches may be connected to one of the ports of the edge switch, with an additional link provided between the two access switches. Other redundant protection configurations are also known in the art. All these configurations are meant to ensure the connection between the access switch (or switches) and the edge switch will be maintained even if there is a failure in one of the ports or in the associated media connecting the edge switch and access switches.

A problem with redundant topologies, however, is that the multiple paths between points in the network can create loops that disrupt the proper functioning of the learning process described above. Furthermore, broadcast packets may be forwarded repeatedly by the switches in the loop, causing a serious problem of network congestion, known as a "broadcast storm."

In order to avoid these problems, the 802.1D standard defines a communication protocol, known as the spanning tree protocol (STP), for managing the creation and updating of the network topology. STP ensures that all data paths in a network of bridges are free of loops by disabling forwarding of packets through certain interfaces. The spanning tree algorithm takes advantage of a standard feature of MAC ports: the ports may be either in a blocking state or a forwarding state. Frames are forwarded through ports in a MAC bridge in the forwarding state, and not through ports in the blocking state. At any time, a given bridge effectively connects only the LANs that are attached to those of the bridge ports that are in a forwarding state. Ports that are in a blocking state do not forward frames. The spanning tree algorithm and protocol thus create a tree-shaped active topology from the arbitrarily-connected components of the network.

The spanning tree algorithm defines one bridge in the network as the root bridge. Each LAN connected to the network has a bridge port that connects it to the root bridge. The port is known as the designated port for the LAN, and the bridge of which the designated port is part is known as the designated bridge for the LAN. The root bridge is the designated bridge for each LAN to which it is connected. Each bridge has a port defined as its root port, which uniquely connects that bridge to the root bridge. All ports on the bridge that are neither the root port nor the designated port are put into the blocking state. Frames destined to cross the network will thus travel from the designated bridge of the originating LAN along a root path toward the root bridge. If the destination bridge does not lie along the root path, the frame will be routed through the root bridge and will travel along a root path from the root bridge to the designated port for the destination LAN.

Although STP is effective in removing network loops, it is very slow in adapting to topology changes that may occur when a network link fails or is subsequently restored.

Responding to a failure typically necessitates recalculating the spanning tree to accommodate the topology change and accordingly transferring bridge ports from the blocking to the forwarding state. The above-mentioned 802.1D standard specifies a procedure for responding to topology changes, which includes reducing the aging time for filtering database entries to 15 sec. Using this procedure with default STP timing parameters (as specified in the above-mentioned 802.1D standard), it still takes 30 sec to transfer ports from the blocking state to the forwarding state. Even with aggressive tuning of the timing, the transfer from blocking to forwarding state takes at least 14 sec, and it generally takes as much as a minute overall for normal network service to be restored.

U.S. Pat. No. 6,032,194, whose disclosure is incorporated herein by reference, describes a method for rapidly reconfiguring a computer network, based on certain modifications to the standard STP. The method assumes that the switches in the network, including both core and access switches, have multiple trunk ports providing connectivity to the STP root via trunk switches. (These trunk switches are comparable to the core switches and edge switches defined above, and the trunk ports are on the upstream side of each switch, i.e., the side leading toward the root.) One of the trunk ports of each switch is placed in the forwarding state, while the others are designated as back-up ports. Upon detection of a failure at the active forwarding port, the switch immediately places one of the back-up trunk ports in the forwarding state, so that it becomes the new active port. The switch then transmits dummy multicast messages toward the root (upstream) through the newly-active trunk port, each containing the source address of a network entity that is coupled to the switch itself or is downstream of the switch. Upon receiving these messages, other devices in the network learn to use the new active port. In order to implement this rapid reconfiguration method, special commands, not a part of the 802.1D standard, are used to modify the STP parameters of both the core switches and the access switches in the network. The patent also suggests modifications to these special commands for operating in a Virtual LAN (VLAN) environment.

A similar rapid reconfiguration algorithm is defined in a draft amendment to the 802.1D standard, entitled "Amendment 2—Rapid Reconfiguration," published as IEEE Draft P802.1w/D10 (Mar. 26, 2001), which is incorporated herein by reference. This draft specifies enhancements to the operation of STP and other mechanisms that support reconfiguration of physical and filtering connectivity in a bridged LAN system. Implementation of the enhanced protocol substantially reduces the time required to recompute the spanning tree and reconfigure switch ports and filtering databases following a network topology change. But it requires that all the switches in the network be replaced or reprogrammed to comply with the amended standard.

SUMMARY OF THE INVENTION

It is an object of some aspects of the present invention to provide methods and devices enabling rapid reconfiguration in response to network topology changes.

It is a further object of some aspects of the present invention to provide methods for rapid recovery from network failures, while maintaining compatibility with existing network equipment and protocols.

In preferred embodiments of the present invention, an edge switch in a MAC network is attached by redundant links to one or more access switches. The edge switch selects one of its access ports (i.e., the ports that are connected to the downstream links to the access switches) to be its active access port, while placing its remaining access port(s) in the blocking state. The blocked ports thus remain physically operational, but they convey no packets and therefore create no actual loops. As a result, when the network switches run STP, only a single branch of the tree passes through the edge switch to the access switches. The redundant links between the edge switch and the access switches are transparent to the standard protocol and do not affect its operation in any way. The access switches and other network entities downstream of the edge switch need not be aware that the redundancy even exists.

When the edge switch detects a failure in its active link to the access switches, it immediately chooses one of the blocked links to serve as the new active link and blocks the failed port. In order to inform the access switches and other downstream equipment that they should now transmit their upstream traffic through the new active link, the edge switch sends dummy frames through the new active link to the access switches. Preferably, the dummy frames have source MAC addresses corresponding to all the destination MAC addresses in the filtering database that was maintained by the edge switch for entities with which the access switches communicated through the failed port. Upon receiving these dummy frames, the access switches use the standard MAC learning algorithm to rebuild their own filtering databases so that upstream traffic is immediately directed to the new active link. The entire process is, again, transparent to the access switches and can typically be completed in less than one second.

Thus, preferred embodiments of the present invention provide a method for fast changeover between redundant network links that can be implemented by modifying a single MAC bridge, without the need for reprogramming or replacing other items of equipment in the network. The bridge is modified, as described above, so as to manage its redundant downstream ports in a novel way. This modification is in contrast to the methods described in U.S. Pat. No. 6,032,194 and the 802.1w draft, which require network entities to be aware of and manage redundancies in their upstream ports, and use special commands to cause them to do so. Therefore, preferred embodiments of the present invention maintain compatibility with STP as provided by the current 802.1D standard. The standard spanning tree algorithm will not only run transparently over the modified bridge, but actually should run faster, since the "radius" of the tree (i.e., the number of branching points over which it must run) is reduced.

Although preferred embodiments are described herein with reference to certain switches, and particularly to edge switches and access switches used in a WAN, the principles of the present invention are generally applicable to bridges of other types and to other network configurations.

There is therefore provided, in accordance with a preferred embodiment of the present invention, a method for network communication, including:

coupling an edge switch in a network to one or more access switches via at least first and second redundant links, respectively connected to first and second ports of the edge switch;

placing the first port in an active state, while placing the second port in a blocking state;

conveying communication traffic over the first link while the first port is in the active state, thereby causing each of the switches to build a respective database for use in forwarding the traffic;

responsive to a failure associated with the first link, placing the second port in the active state and the first port in the blocking state; and sending dummy traffic from the edge switch over the second link to the one or more access switches, so as to cause each of the one or more access switches to modify its respective database responsive to the second port being in the active state.

Preferably, placing the second port in the blocking state includes configuring the first and second ports so that no loop is created in the network between the edge switch and the one or more access switches, and configuring the first and second ports includes configuring the edge switch so as to decrease a radius of a spanning tree established in the network.

Further preferably, the method includes, responsive to placing the second port in the active state, updating the database of the edge switch so that entries in the database point to the second port instead of the first port. Preferably, updating the database includes changing the entries in the database to point to the second port before receiving the communication traffic from the one or more access switches on the second port.

Additionally or alternatively, sending the dummy traffic includes sending data frames originating at the edge switch while having source addresses corresponding to network addresses of other entities in the network that are accessible to the access switches via the edge switch. Preferably, sending the data frames includes copying the source addresses for the data frames from the database of the edge switch. In a preferred embodiment, the edge switch has three or more ports, including the first and second ports, and prior to the failure, the database includes entries associated with a plurality of the ports, and copying the source addresses includes using the network addresses in all the entries that are not associated with the first port as the source addresses of the data frames. In a further preferred embodiment, sending the data frames includes incorporating a Virtual Local Area Network (VLAN) tag in a header of the data frames. Preferably, sending the data frames includes multicasting the data frames to all of the one or more access switches.

There is also provided, in accordance with a preferred embodiment of the present invention, a method for network communication, including:

coupling a first bridge in a network to a second bridge located downstream of the first bridge, by connecting at least first and second redundant links to respective first and second ports of the first bridge so as to communicate with the second bridge;

placing the first port in an active state, while placing the second port in a blocking state;

conveying communication traffic over the first link while the first port is in the active state, thereby causing the bridges to build respective databases for use in forwarding the traffic;

responsive to a failure associated with the first link, placing the second port in the active state and the first port in the blocking state; and sending dummy traffic from the first bridge over the second link downstream to the second bridge, so as to cause the second bridge to modify its database responsive to the second port being in the active state.

There is additionally provided, in accordance with a preferred embodiment of the present invention, a network switching device, including:

a network port, adapted to be coupled over a network trunk link to a core switch in a network so as to exchange communication traffic with the core switch;

first and second access ports, adapted to be coupled via first and second redundant network access links to one or more access switches serving network users; and a protocol processor, adapted to place the first access port in an active state, while placing the second access port in a blocking state, so that the communication traffic is conveyed over the first link while the first port is in the active state, thereby causing each of the access switches to build a respective access switch database for use in forwarding the traffic, the protocol processor being further adapted, responsive to a failure associated with the first link, to place the second access port in the active state and the first port in the blocking state and to send dummy traffic through the second access port over the second link to the one or more access switches, so as to cause each of the one or more access switches to modify its respective access switch database responsive to the second access port being in the active state.

Preferably, the device includes a memory, wherein the protocol processor is adapted to build an edge switch database in the memory responsive to the communication traffic prior to the failure associated with the first link and, responsive to placing the second access port in the active state, to update the edge switch database so that entries in the edge switch database point to the second access port instead of the first access port.

There is further provided, in accordance with a preferred embodiment of the present invention, a bridge device for use in a communication network having a spanning tree root, the device including:

a designated port, adapted to be coupled over an upstream link in the network so as to communicate with the root;

first and second downstream ports, adapted to be coupled via first and second redundant links to a further bridge device located downstream in the network relative to the spanning tree root; and a protocol processor, which is adapted to place the first downstream port in an active state, while placing the second downstream port in a blocking state, so that communication traffic is conveyed over the first downstream link while the first port is in the active state, thereby causing the bridge devices to build respective databases for use in forwarding the traffic, the protocol processor being further adapted, responsive to a failure associated with the first link, to place the second downstream port in the active state and to send dummy traffic over the second link downstream to the further bridge device, so as to cause the further bridge device to modify its database responsive to the second downstream port being in the active state.

The present invention will be more fully understood from the following detailed description of the preferred embodiments thereof, taken together with the drawings in which:

BRIEF DESCRIPTION OF THE DRAWINGS

FIG. 3 is a flow chart that schematically illustrates a method for reconfiguring switches in a computer network following a failure in the network, in accordance with a preferred embodiment of the present invention.

DETAILED DESCRIPTION OF PREFERRED EMBODIMENTS

Figure 1:
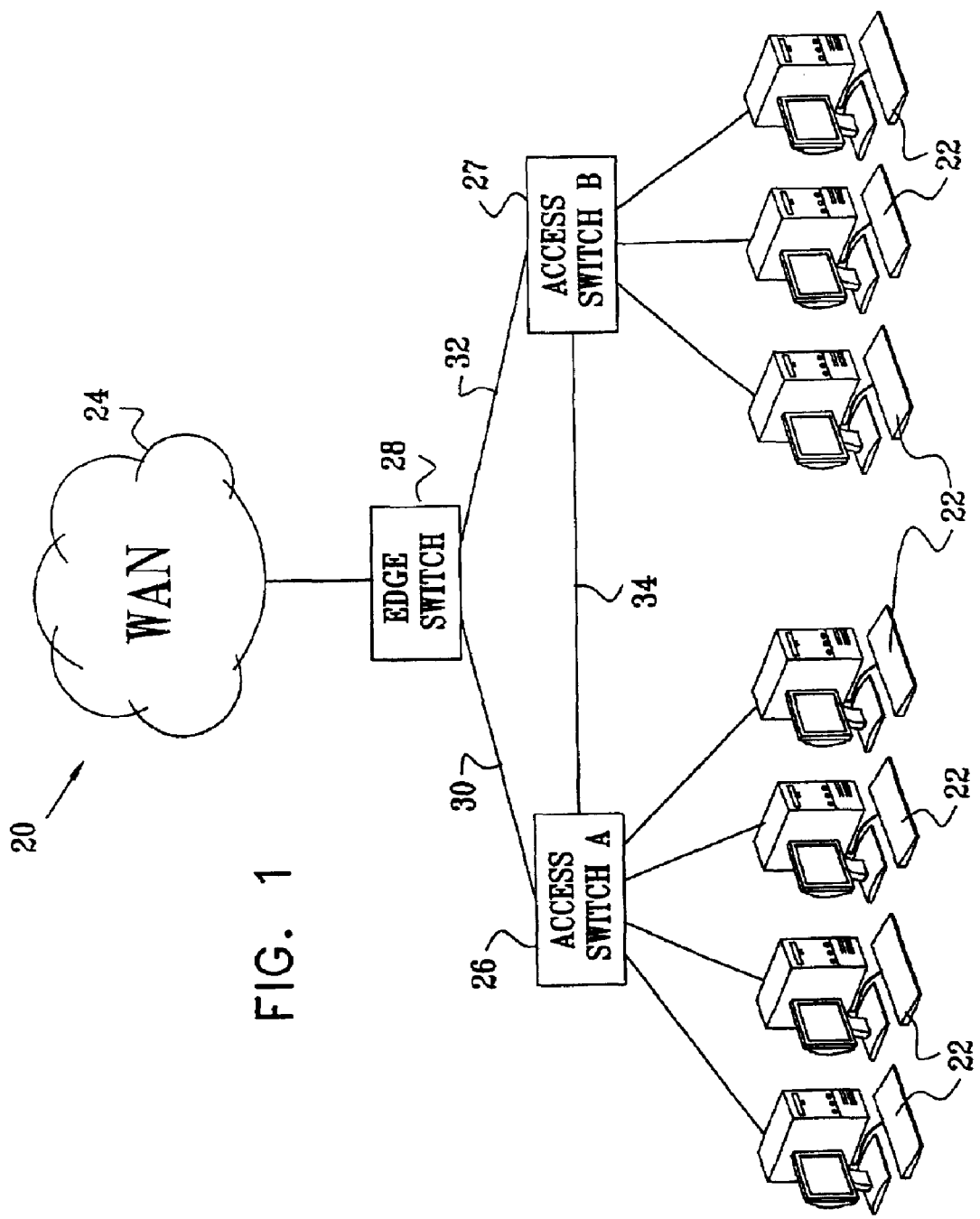
FIG. 1 is a schematic, pictorial illustration showing a computer network, in accordance with a preferred embodiment of the present invention.

FIG. 1 is a block diagram that schematically illustrates a computer network 20, which is configured with redundant links for fast protection of user access in case of network failure, in accordance with a preferred embodiment of the present invention. Network 20 serves multiple users 22, who are connected via access switches 26 and 27 (marked access switches A and B) to a WAN 24. Each of the access switches is connected by a respective access link 30 or 32 to an edge switch 28, which is in turn connected to the core WAN. A lateral link 34 between access switches 26 and 27 is used to provide protection in case of a failure in one of access links 30 or 32 or in the corresponding ports of the access switches or edge switch. Protection could similarly be afforded by providing a single access switch with dual edge ports to edge switch 28.

Links 30, 32 and 34 create a loop in network 20. Ordinarily, running STP on the network would lead to one of these links being blocked in order to eliminate the loop. Edge switch 28, however, is designed to automatically block one of links 30 and 32 before STP is run, so that there is no loop for STP to eliminate. The edge switch reactivates the blocked loop when required due to occurrence of a fault in the active link. Details of this mechanism are described hereinbelow.

Typically, network 20 is an Ethernet network, and switches 26, 27 and 28 operate in accordance with Ethernet physical layer specifications and access protocols, as set forth in ANSI/IEEE standard 802.3. Alternatively, the principles of the present invention may be implemented using network types and bridge devices of other sorts. Similarly, although for the sake of clarity of explanation, FIG. 1 shows a certain, simplified network configuration, the devices and methods described herein and the principles they embody may similarly be applied in other configurations that implement redundant network links. Typically, users 22 are connected to access switches 26 and 27 by a LAN, as is known in the art, but these details are omitted from the figures for the sake of clarity of illustration. As another example, although edge switch 28 is shown as having only a single link to WAN 24, in actually the edge switch typically has two or more redundant links. If these links are both connected to another core switch upstream of the edge switch, they can be managed by the core switch in a manner substantially similar to that described below.

Figure 2A:
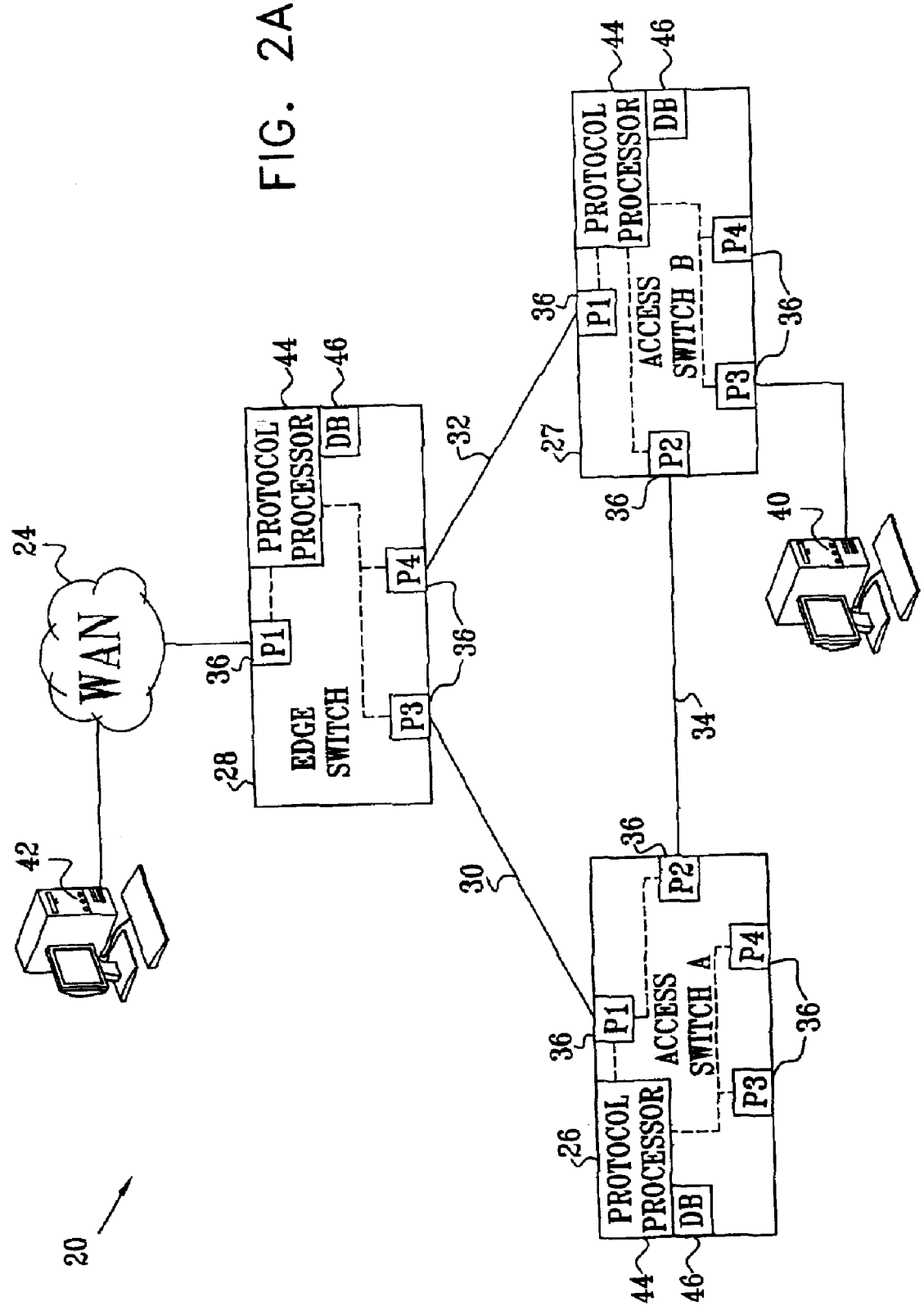
FIG. 2A is a block diagram that schematically shows details of switches in a computer network, in accordance with a preferred embodiment of the present invention.

FIG. 2A is a block diagram that schematically shows details of the interconnection of switches 26, 27 and 28, in accordance with a preferred embodiment of the present invention. Each of the switches has multiple ports 36, labeled P1, P2, P3, P4, as well as a protocol processor 44, which is responsible for configuring and controlling the ports. Other elements of the switches that are not essential to an understanding of the present invention are omitted from the figure for the sake of clarity. The additional elements required will be apparent to those skilled in the art.

Preferably, each protocol processor 44 comprises a central processing unit (CPU), which is programmed in software to carry out the protocols and other functions specified in the above-mentioned 802.1D standard. Alternatively, the processor may comprise dedicated processing hardware or a combination of hardware and software elements. The functions of processor 44 include building and updating a filtering database (DB) in a memory 46 and running STP as required. In addition, processor 44 in edge switch 28 is responsible for managing redundant links 30 and 32 in a novel manner provided by the present invention. The processors in access switches 26 and 27, on the other hand, typically run the standard 802.1D protocols and are unaware of the link management function performed by switch 28.

Upon startup of network 20, preferably before STP is run, processor 44 in switch 28 selects one of links 30 and 32 to serve as its active link to access switches 26 and 27, while the other link is placed on standby. For the sake of example, let link 30 be the active link. Processor 44 accordingly puts port P3 of switch 28 in the forwarding state, while putting port P4 in blocking state. This means that P4 will transmit no frames over link 32, and will discard any frames it receives on the link. The physical layer of P4 remains operational, however, so that port P1 of switch 27 does not sense any loss of signal on link 32. Therefore, when STP is run by processors 44, no traffic passes through link 32, and thus no loop exists, so that STP maintains port P1 of switch 27 in the forwarding state. Since switch 27 will receive no frames on port P1, it will also create no entries for this port in its filtering database.

Figure 2B:
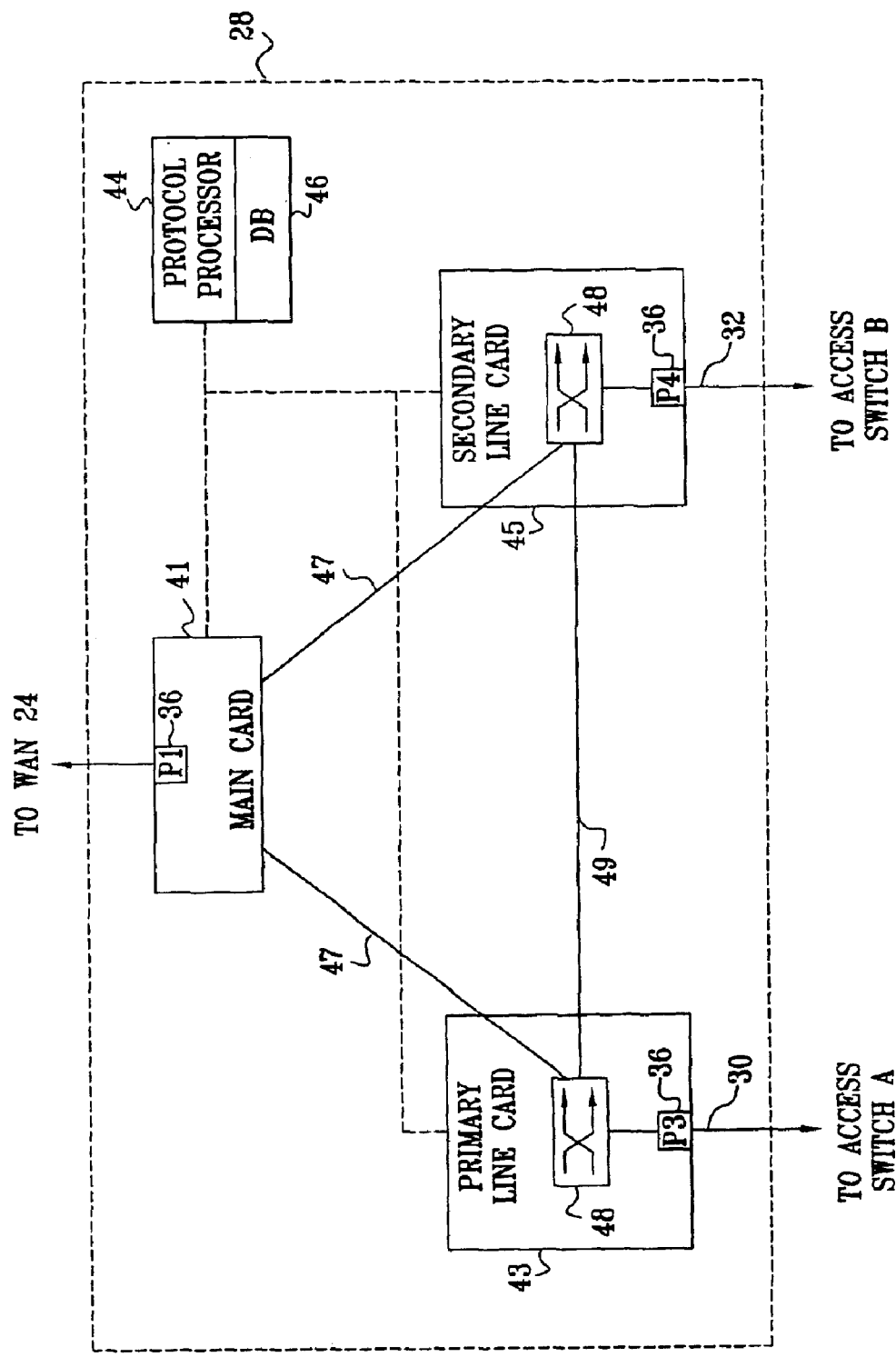
FIG. 2B is a block diagram that schematically shows further details of an edge switch in the computer network of FIG. 2A, in accordance with a preferred embodiment of the present invention.

FIG. 2B is a block diagram that schematically shows details of edge switch 28, in accordance with a preferred embodiment of the present invention. In this embodiment, switch 28 comprises a main card 41, which connects the switch to WAN 24 via port P1, and primary and secondary line cards 43 and 45 that serve ports P3 and P4, respectively. The main cards and line cards are preferably mounted together on a backplane and communicate with one another via backplane channels 47. Each of the line cards is build around a switching core 48, which may be implemented simply as an Ethernet switch, for example. Typically, edge switch 28 has additional ports and may also include additional line cards, but these elements are omitted from the figure for simplicity of illustration. In any case, the structure of switch 28 is shown in FIG. 2B only by way of example, and the methods of failure protection described herein may be applied regardless of the internal structure of the network node in which they are implemented.

In normal operation, communication traffic between WAN 24 and access switches 26 and 27 is passed from main card 41 to core 48 of primary line card 43. Core 48 passes the traffic both to port P3 on card 43 and to secondary line card 45, via a protection channel 49. (When operating in a VLAN environment, core 48 broadcasts the traffic in the relevant VLAN domain, including protection channel 49.) Because port P4 is normally blocked, core 48 in secondary line card 45 discards the traffic. Preferably, database 46 is shared among cards 41, 43 and 45, and all the cards participate in learning the entries to be inserted in the database, based on the frames that they receive at their respective ports. Thus, although protocol processor 44 is shown here as a single, separate entity, its functions are in actuality distributed among a number of separate processors embedded in the different cards.

Returning now to FIG. 2A, when users 40 and 42 attempt to communicate over network 20, all the traffic between them will pass through switch 26, via links 30 and 34. This topology will be reflected in the contents of the filtering databases of the switches in the network, as shown in Table I below:

TABLE I

FILTERING DATABASES TN NORMAL TOPOLOGY

| Destination MAC | Edge switch 28 | Access switch 26 | Access switch 27 |
|---|---|---|---|
| User 40 | P3 | P2 | P3 |
| User 42 | P1 | P1 | P2 |

FIG. 3 is a flow chart that schematically illustrates a method by which edge switch 28 responds to a failure in link 30, in accordance with a preferred embodiment of the present invention. The method is invoked when processor 44 of switch 28 senses a failure at port P3, at a failure sensing step 50. This port is referred to here as the primary port, i.e., the port that is used originally at switch 28, and which presumably continues to be used until a failure occurs. Port P4 of switch 28 is referred to as the secondary port. Processor 44 may sense the failure using any suitable method known in the art for detecting link and port failures. The response of the processor to the failure is substantially the same regardless of whether the failure is due to a fault in link 30 itself or in one of ports 36 to which the link is connected.

Upon sensing the failure, processor 44 of edge switch 28 blocks its port P3 and activates its port P4 instead, at a secondary port activation step 52. In the embodiment of FIG. 2B, for example, primary line card 43 typically disables port P3 and signals secondary line card 45 to enable port P4. (In the case of a total failure of the primary line card, rather than just a port or line failure, main card 41 preferably uses backplane channel 47 to communicate with the secondary line card.) Now edge switch 28 and access switch 27 can immediately begin exchanging traffic over link 32. The filtering databases maintained by the switches are no longer accurate, however. While access switch 26 may sense the failure in link 30 at the same time as switch 28 does, it will not begin sending traffic over links 34 and 32 in its stead until its filtering database has been updated. Communication is delayed for as long as the database entries are incorrect.

In order to shorten this delay, edge switch 28 sends dummy frames downstream to access switch 27 via link 32, at a dummy transmission step 54. For every entry in the filtering database of the edge switch that is not associated with the failed port (P3 in the present example), the edge switch sends a dummy frame over link 32 to access switch 27, with a source MAC address equal to the destination MAC address listed for that entry. In other words, the source MAC address of each dummy frame is the address of a MAC entity on WAN 24 that previously communicated with users of the access switches, such as user 40, and was thus learned at the upstream port P1. The destination MAC address of the dummy frame is a multicast address or other special address selected to ensure that the dummy frame is flooded to all the switches downstream from the edge switch. When switch 27 receives the dummy frame, it also forwards it to switch 26. Thus, referring to the example in Table I above, edge switch 28 will send a multicast frame to access switch 27 containing the MAC address of user 42 as its source address, and switch 27 will flood this packet to switch 26, as well.

Once the dummy frame has been sent, switches 26, 27 and 28 update their filtering databases to reflect the change in the active link from link 30 to link 32, at a database update step 56. Edge switch 28 simply replaces the failed port (P3) in the entries in its database with the new active port (P4) that has taken its place. Access switches 26 and 27 update their databases in accordance with the conventional learning procedure specified in the 802.1D standard, using the source addresses that they cull from the dummy frames sent by the edge switch. Table II shows the contents of the filtering databases that result from this process, with the altered entries shown in boldface:

TABLE II

FILTERING DATABASES AFTER PROTECTION

| Destination MAC | Edge switch 28 | Access switch 26 | Access switch 27 |
|---|---|---|---|
| User 40 | P4 | P2 | P3 |
| User 42 | P1 | P2 | P1 |

The time required to complete the link changeover and database update is the sum of the time required to detect the failure (typically a few milliseconds) and the transmission time of the dummy frames. Assuming links 30, 32 and 34 to be Ethernet links operating at 100 Mb/s, 2000 frames of 64 bytes each can be sent over these links in 10 ms. Therefore, the entire process shown in FIG. 3 can be completed in well under a second, after which normal operation of the network can resume. In many practical applications, the vast majority of the traffic between WAN 24 and edge switch 28 passes through a single router, such as an Internet Protocol (IP) router, in the WAN. In such cases, it may be necessary to send only a small number of dummy frames, so that the process can be completed even faster.

When link 30 is restored, port P4 of edge switch 28 can be deactivated (and placed in the blocked state), and port P3 reactivated (and returned to the forwarding state). Preferably, switch 28 can be programmed to operate in either a revertive mode, in which the primary port is reactivated immediately when link 30 is restored, or in a non-revertive mode, in which the primary port is reactivated only in the event of a failure on link 32. In either case, the procedure of steps 54 and 56 is then repeated in order to update the filtering databases once more. In the revertive mode, switch 28 is preferably programmed to delay reverting to the primary port until a "Wait To Restore" (WTR) period has elapsed, in order to avoid rapid oscillations between the primary and secondary ports. The duration of the WTR period is also user configurable.

The filtering databases maintained by switches 26, 27 and 28 may also contain Virtual LAN (VLAN) identifiers, or tags, as specified in ANSI/IEEE standard 802.1Q. The method of FIG. 3 can be modified to support VLAN addressing simply by adding the appropriate VLAN tag to each dummy frame sent at step 54.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for network communication, comprising:
  coupling an edge switch in a network to one or more access switches via at least first and second redundant links, respectively connected to first and second ports of the edge switch;
  placing the first port in an active state, while placing the second port in a blocking state;

conveying communication traffic over the first link while the first port is in the active state, thereby causing each of the switches to build a respective database for use in forwarding the traffic;

responsive to a failure associated with the first link, placing the second port in the active state and the first port in the blocking state; and sending dummy traffic from the edge switch over the second link to the one or more access switches, so as to cause each of the one or more access switches to modify its respective database responsive to the second port being in the active state.

2. A method according to claim 1, wherein placing the second port in the blocking state comprises configuring the first and second ports so that no loop is created in the network between the edge switch and the one or more access switches.

3. A method according to claim 2, wherein configuring the first and second ports comprises configuring the edge switch so as to decrease a radius of a spanning tree established in the network.

4. A method according to claim 1, and comprising, responsive to placing the second port in the active state, updating the database of the edge switch so that entries in the database point to the second port instead of the first port.

5. A method according to claim 4, wherein updating the database comprises changing the entries in the database to point to the second port before receiving the communication traffic from the one or more access switches on the second port.

6. A method according to claim 1, wherein sending the dummy traffic comprises sending data frames originating at the edge switch while having source addresses corresponding to network addresses of other entities in the network that are accessible to the access switches via the edge switch.

7. A method according to claim 6, wherein sending the data frames comprises copying the source addresses for the data frames from the database of the edge switch.

8. A method according to claim 7, wherein the edge switch has three or more ports, including the first and second ports, and wherein prior to the failure, the database comprises entries associated with a plurality of the ports, and wherein copying the source addresses comprises using the network addresses in all the entries that are not associated with the first port as the source addresses of the data frames.

9. A method according to claim 6, wherein sending the data frames comprises incorporating a Virtual Local Area Network (VLAN) tag in a header of the data frames.

10. A method according to claim 6, wherein sending the data frames comprises multicasting the data frames to all of the one or more access switches.

11. A method according to claim 1, wherein sending the dummy traffic comprises sending data frames downstream from the edge switch toward the access switches.

12. A method for network communication, comprising:

coupling a first bridge in a network to a second bridge located downstream of the first bridge, by connecting at least first and second redundant links to respective first and second ports of the first bridge so as to communicate with the second bridge;

placing the first port in an active state, while placing the second port in a blocking state;

conveying communication traffic over the first link while the first port is in the active state, thereby causing the bridges to build respective databases for use in forwarding the traffic;

responsive to a failure associated with the first link, placing the second port in the active state and the first port in the blocking state; and sending dummy traffic from the first bridge over the second link downstream to the second bridge, so as to cause the second bridge to modify its database responsive to the second port being in the active state.

13. A network switching device, comprising:

a network port, adapted to be coupled over a network trunk link to a core switch in a network so as to exchange communication traffic with the core switch;

first and second access ports, adapted to be coupled via first and second redundant network access links to one or more access switches serving network users; and a protocol processor, adapted to place the first access port in an active state, while placing the second access port in a blocking state, so that the communication traffic is conveyed over the first link while the first port is in the active state, thereby causing each of the access switches to build a respective access switch database for use in forwarding the traffic, the protocol processor being further adapted, responsive to a failure associated with the first link, to place the second access port in the active state and the first port in the blocking state and to send dummy traffic through the second access port over the second link to the one or more access switches, so as to cause each of the one or more access switches to modify its respective access switch database responsive to the second access port being in the active state.

14. A device according to claim 13, wherein the protocol processor is adapted to configure the first and second access ports so that no loop is created in the network between the edge switch and the one or more access switches.

15. A device according to claim 14, wherein the protocol processor is further adapted to configure the first and second access ports so as to decrease a radius of a spanning tree established in the network.

16. A device according to claim 13, and comprising a memory, wherein the protocol processor is adapted to build an edge switch database in the memory responsive to the communication traffic prior to the failure associated with the first link and, responsive to placing the second access port in the active state, to update the edge switch database so that entries in the edge switch database point to the second access port instead of the first access port.

17. A device according to claim 16, wherein the protocol processor is adapted to update the entries in the database to point to the second access port before receiving the communication traffic from the one or more access switches on the second port.

18. A device according to claim 13, wherein the dummy traffic comprises data frames originating at the edge switch while having source addresses corresponding to network addresses of other entities in the network that are accessible to the access switches via the edge switch.

19. A device according to claim 18, and comprising a memory, wherein the protocol processor is adapted to build an edge switch database in the memory responsive to the communication traffic prior to the failure associated with the first link, and to copy the source addresses for the data frames from the edge switch database.

20. A device according to claim 19, wherein prior to the failure, the edge switch database comprises entries associated with a plurality of the ports, and wherein the protocol processor is adapted to use the network addresses in all the entries that are not associated with the first access port as the source addresses of the data frames.

21. A device according to claim 18, wherein the protocol processor is adapted to incorporate a Virtual Local Area Network (VLAN) tag in a header of the data frames.

22. A device according to claim 18, wherein the protocol processor is adapted to multicast the data frames to all of the one or more access switches.

23. A device according to claim 13, wherein the dummy traffic comprises data frames sent downstream from the edge switch toward the access switches.

24. A bridge device for use in a communication network having a spanning tree root, the device comprising:

a designated port, adapted to be coupled over an upstream link in the network so as to communicate with the root;

first and second downstream ports, adapted to be coupled via first and second redundant links to a further bridge device located downstream in the network relative to the spanning tree root; and a protocol processor, which is adapted to place the first downstream port in an active state, while placing the second downstream port in a blocking state, so that communication traffic is conveyed over the first downstream link while the first port is in the active state, thereby causing the bridge devices to build respective databases for use in forwarding the traffic, the protocol processor being further adapted, responsive to a failure associated with the first link, to place the second downstream port in the active state and to send dummy traffic over the second link downstream to the further bridge device, so as to cause the further bridge device to modify its database responsive to the second downstream port being in the active state.

* * * * *